(12) United States Patent  (10) Patent No.: US 6,994,309 B2
Fernández-Sein  (45) Date of Patent: Feb. 7, 2006

(54) REMOTELY OPERATED SELF-POWERED GAS SAFETY VALVE

(76) Inventor: Rafael Fernández-Sein, P.O. Box 1835, San Germán, PR (US) 00685-1835

( * ) Notice: Subject to any disclaimer, the term of this patent is extended or adjusted under 35 U.S.C. 154(b) by 31 days.

(21) Appl. No.: 10/878,200

(22) Filed: Jun. 28, 2004

(65) Prior Publication Data

US 2005/0285069 A1  Dec. 29, 2005

(51) Int. Cl.
*F16K 31/02* (2006.01)
(52) U.S. Cl. .............. 251/129.04; 251/129.11; 251/315.01
(58) Field of Classification Search .......... 251/129.04, 251/129.11, 315.01, 315.1, 315.11
See application file for complete search history.

(56) References Cited

U.S. PATENT DOCUMENTS 5,427,350 A * 6/1995 Rinkewich ............... 251/30.01
6,016,832 A * 1/2000 Vars et al. ............... 137/487.5
6,337,635 B1 * 1/2002 Ericksen et al. ....... 340/825.69
6,662,821 B2 * 12/2003 Jacobsen et al. ............ 137/312

* cited by examiner

*Primary Examiner*—Justine R. Yu
*Assistant Examiner*—John K. Fristoe, Jr.
(74) *Attorney, Agent, or Firm*—Eugenio J. Torres

(57) ABSTRACT

An apparatus for the remote measurement, control, and supervision, via a wired or wireless network connection, of the flow of gas, allowing fully opening or closing a valve in case of an emergency or for administrative purposes. The apparatus also provides for flow pressure, barometric pressure, and a temperature compensated gas flow meter. The apparatus obtains the number of revolutions of a rotor which delivers a fixed amount of gas per revolution and compensates for gas bypassing the rotor. The apparatus is self-powered by the energy produced by an electric generator coupled to the flow measurement rotor. The surplus energy not used by the electronic components in measuring and reporting is stored for the operation of the rotary control valve. The apparatus is housed in a planar base plate that allows servicing from one side of the system. The apparatus uses an energy storage management system for the controlled charging and use of the apparatus in an intrinsically safe manner.

19 Claims, 3 Drawing Sheets

REMOTELY OPERATED SELF-POWERED GAS SAFETY VALVE

STATEMENT REGARDING FEDERALLY SPONSORED RESEARCH AND DEVELOPMENT

N/A

RELATED APPLICATIONS

N/A

BACKGROUND OF THE INVENTION

1. Field of the Invention

The present invention relates generally to gas safety valves and, more specifically, to the gas safety valves which are used for the supervised control or shutoff of the gas supply in case of a leak, an emergency, or an administrative procedure. This invention also relates to the field of gas meters and the remote operation of the gas supply.

2. Discussion of the Background

At present, gas meters can be classified into several categories: (a) displacement, such as rotary, diaphragm, and turbine, (b) fluidic, such as vortex-shedding meters, and (c) thermodynamic, such as ultrasonic time of flight meters and thermal loss meters. The displacement meters of the rotary type, where intermediate flows are encountered, have been in use in commercial and industrial settings for many years. Such gas meters and their improvements are discussed in the following patents, which are incorporated herein by reference:

A. U.S. Pat. No. 5,637,805 to Adams, et al. ('805);
B. U.S. Pat. No. 5,046,369 to Boyd, et al. ('369);
C. U.S. Pat. No. 4,918,995 to Pearman, et al.; and
D. U.S. Pat. No. 4,910,519 to Duell, et al. ('519).

The procedure for reading residential, commercial, or industrial gas meters is a laborious and costly process. It is therefore very desirable to have a method through which the gas meter can be remotely read for billing purposes. There have been several inventions that apply to this matter, but all of these typically require an external supply or battery power for proper operation.

For instance, U.S. Patent '369 discloses a flow meter capable of operating from a variety of sources, such as the AC supply mains, or solar panels feeding storage batteries. The first source is costly in a remote location, and may introduce some hazards in the implementation. The second source is cumbersome, costly, and subject to vandalism in urban settings. In addition, U.S. Patent '805 discloses the use of a battery pack of D cells, which are very costly to maintain or replace periodically.

Emergencies or administrative procedures, both requiring that the gas supply be shutoff, may arise in the premises or general location where the gas meter is located. Currently, there are several proposed solutions to shutting off the gas supply remotely. For example, U.S. Pat. No. 5,209,454 to Engdahl et al. ('454) discloses a safety shutoff valve for insertion into a gas line or other fluid line, which closes in response to an electrical input pulse or to a seismic disturbance. However, even though the invention of '454 allows for the closing of the shutoff valve from a remote location, it teaches a manual reset.

In addition to the foregoing, U.S. Pat. No. 5,484,103 to Schultz ('103) and '454 both disclose solenoid actuated valves which require energy expenditures at higher voltages and currents, which limits their usefulness in an ambient of explosive mixtures or at a location with limited access to power mains. The installation of an external power connection can be very expensive and may require special arrangements with the power company. In addition, external energy supplies have to be installed within special enclosures to minimize the danger of an explosion in a hazardous environment.

The following patents are pertinent to this topic and are incorporated herein by reference:

A. U.S. Pat. No. 5,575,309 to Connell which discloses a solenoid actuator for a fluid flow valve.
B. '995 which discloses an electronic compact gas meter including a solid state flow sensor for sensing gas flow rate, data acquisition circuits including an analog-to-digital converter coupled to the sensor for controlling the same and providing an output indicative of gas flow, and a digital data processor for receiving the gas flow information from the analog-to-digital converter, processing the information and registering the volumetric gas flow reading at the meter and/or transmitting the volume flow information via wireless or telephone communication lines to a remote location;
C. '519 which discloses electronic volume correctors which sample the mechanical metered volume reading of the flow through a gas pipeline according to the gas laws, which incorporate the pressure and temperature parameters of the gas, with analog sensors and inputs them into an analog to digital converter. The digital output from the converter is employed to obtain a more accurate digital volume reading.
D. U.S. Pat. No. 5,595,207 to Jiles which discloses a tension actuated gas shutoff valve having a body with an inlet for receiving gas flow along a flow path from upstream to downstream and a piston slidable within the body. The piston slides in response to a longitudinal force applied across the valve between a first position wherein flow through the valve is prevented and a second position wherein flow through the valve is permitted.
E. U.S. Pat. No. 5,584,465 to Ochsenreiter which discloses a solenoid latching valve movable between open and closed positions employing a latching magnet and a spring to maintain a plunger in the open and closed positions respectively.
F. U.S. Pat. No. 4,921,008 to Foster which discloses an automatic emergency fluid flow shutoff device for use primarily with gas cylinder operations wherein a ball located in the device completely closes off an orifice to stop further gas flow when there is a sudden loss of resistance downstream of the device due to a cut hose or a fire from a severed hose. The device also incorporates a gas flow meter or pressure gauge as part of the reset mechanism thus eliminating additional connectors.

Various gas safety valves have recently been disclosed, yet none provide a remotely operable, cost efficient, gas safety valve such as the gas safety valve of the present invention.

While these devices or methods in the prior art fulfill their respective, particular objectives and requirements, none of them, however, provide a remotely operated self-powered gas safety valve that takes advantage of the technology developed to date in order to remotely, securely, and automatically shutoff and reset the gas supply in case of an emergency. Thus, it can be appreciated that there is a continuing need for a new and improved remotely operated self-powered gas safety valve which overcomes these and other deficiencies in the prior art. In this regard, the present invention substantially fulfills this need.

However, none of the existing art, taken either simply or in combination teach the use of the very principle of the meter to derive the necessary electric energy to power the electronic circuits and devices required to remotely read a gas meter and control a valve. Additionally, none of the existing art teaches the use of an energy storage management system for the controlled charging and use in an intrinsically safe manner. In this respect, the device according to the present invention substantially departs from the conventional concepts and designs of the prior art to fulfill the aforementioned need.

SUMMARY OF THE INVENTION

It is an object of the present invention to provide a device to accomplish closure of a gas valve from a remote location upon detection of a gas leak or as a preventive measure.

It is a further object of the present invention to provide a gas safety valve that can be turned on or closed off from a remote location.

It is another object of the present invention to generate at the location of the valve the energy necessary to actuate the gas valve when commanded.

Another object of this invention is to provide a gas flow meter that compensates for operating conditions of temperature and pressure, and corrects for gas bypass of the meter rotor and that can be remotely read.

Another object of the present invention is to provide a device that will not cause an explosion, even in the presence of explosive fuel gas mixtures.

A further object of the present invention is to provide a device that stores the energy over a long period of time (relative to the operation of the valve) and makes the stored energy available to be used for valve actuation.

According to another aspect of the present invention the energy required to actuate the valve is generated over a long time in small amounts and at such low voltages that there is never danger of causing a gas explosion.

According to a further aspect of the present invention, a system presents a digital number representing the measured value to a network interface device.

In still another aspect of the present invention, this network interface device communicates the results of the measurements to a supervisory device and receives commands from the supervisory device.

It is another aspect of the present invention that the connecting media for the network may be accomplished via wired, wireless, optical fiber, or infrared methods.

The gas safety valve itself, both as to its construction and its mode of operation, will be best understood and additional objects and advantages thereof will become apparent, by the following detailed description of a preferred embodiment taken in conjunction with the accompanying drawings.

When the word "invention" is used in this specification, the word "invention" includes "inventions", that is, the plural of "invention". By stating "invention", the Applicant does not in any way admit that the present application does not include more than one patentably and non-obviously distinct invention and Applicant maintains that the present application may include more than one patentably and non-obviously distinct invention.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DESCRIPTION OF THE PREFERRED EMBODIMENT

Figure 1:
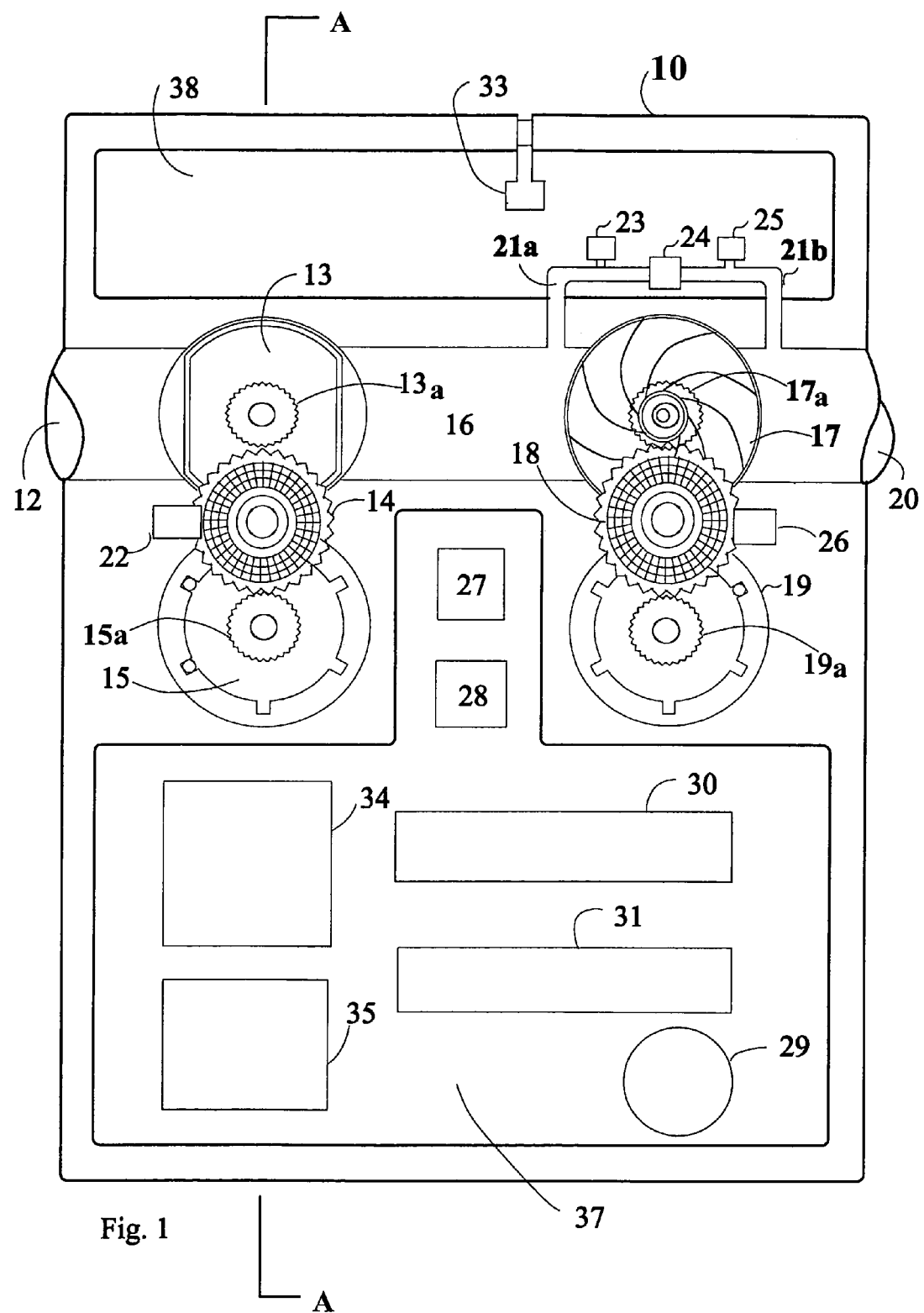
FIG. 1 shows a top view of the gas safety valve of the invention with the top cover removed.
Figure 2:
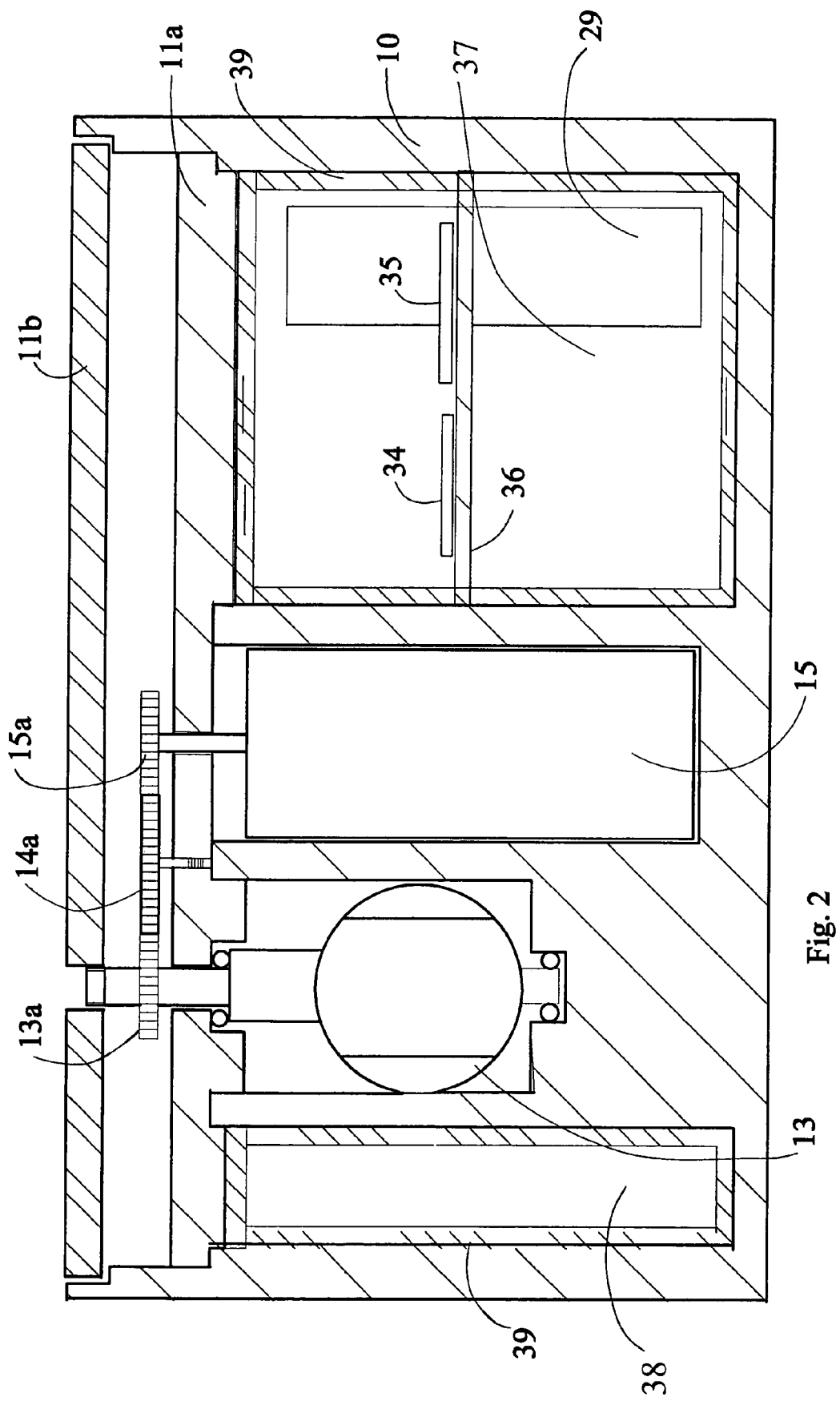
FIG. 2 shows a sectional view of the gas safety valve of the invention.

Referring now to the drawings, wherein like reference numerals designate the corresponding structure, part, or element, as the case may be, throughout the views, and particularly to FIG. 1, a gas safety valve constructed in accordance with the preferred embodiment of the present invention comprises a base plate 10, where the components of the system are placed, having cavities and pathways for the different components, further comprising an inside cover plate 11a and an outside cover plate 11b, as shown in FIG. 2, wherein an intake pathway 12 leads the way to a ball valve 13 that rotates within a cavity machined into base plate 10. The ball valve 13 is linked via a rotary gear to an electronically commutated reversing direct-current motor 15 with reduction gearing 15a. Position sensor 22 determines the position of the ball valve 13 and verifies if it is in the fully open or fully closed position.

The present invention serves the dual purpose as a gas control device and of a gas meter. In this mode of operation, the system may receive a command from the remote supervising system to close the valve. This command may arise from an emergency, such an earthquake, fire, or severe weather, or from an administrative decision. In the case of an emergency, it is desired that the valve shutoff completely. Although limit sensors have been provided for the ball valve 13, gas pressure sensor 23 can be used as a redundant check for the seating of valve 13. Conversely, when in the course of normal operations, a loss of pressure is detected while the open valve limit sensor indicates the valve is open, a loss of system pressure can be detected and reported to the remote supervising system. The shutoff valves commonly employed in gas service may be unused for long periods of time, sometimes in the order of several years. To prevent the sticking of the valve described here, the microprocessor 30 will command the exercise of the valve periodically.

There is a connecting pathway 16 between ball valve 13 and bladed rotary fan 17, which is free to rotate in a cavity cut into base plate 10. This rotary fan is linked via intermediate gear 18 to a rotary electric generator 19. The outlet pathway for system is shown as 20. Sampling passageway 21a allows pressure sensor 23 and temperature sensor 25 to measure the operating gas pressure and temperature for compensations, whereas; sampling pathway 21b brings another leg to differential pressure sensor 24 to allow the calculation of corrections for the amount of gas that flows past the rotary fan blade at low rotational speeds. The analog outputs of these sensors are converted into digital quantities by analog to digital converter 28.

Rotor speed sensor 26 sends a pulse to microprocessor 30 every time the rotary fan volute turns, delivering a known volume of gas for every turn. When bladed fan rotary gas meter head rotates, the rotor for alternator 19 also rotates, generating an alternating current which is rectified by circuit 27 and used to charge battery 29. Voltage regulator and energy management-battery charging module 35 provide the energy for the entire system. Electronic commutation module 34 provides the electronic commutation and control of electric motor 15. Battery charging module 35 provides voltage regulation and energy management for the entire assembly. Communications remote control interface module 31 allows the system to establish two-way communications with a remote supervisory device, thus accepting commands, and delivering flow and status information.

Since the system of the preferred embodiment may be exposed to high temperatures as during a fire from a gas leak, the entire electronics package is enclosed by a thermal insulation barrier 39. Isolation plate 11b separates the mechanical rotating parts from the electronics parts, and inside cover plate 11a covers and protects the entire system. Electronic parts are mounted on printed circuit board 36 and placed inside first cavity 37, sensors that come in contact with the measured gas are placed within second cavity 38. This is done so that if there is a leak, the escaping gas will be contained within second cavity 38.

Measurement of the quantity of gas is performed in the following manner. Every time the rotary fan volute makes one turn, a signal is recorded by the microprocessor, from which a term $Q_d$, indicating the actual or displaced gas passed at the existing metering conditions in cubic feet is derived by multiplying the number of terms times the volume delivered in cubic feet per turn. The general equation for obtaining the quantity of gas delivered at contract base pressure and temperature, in cubic feet is this:

$$Q_s = Q_d P_m T_m (F_{pv})^2$$

where:
- $Q_s$=quantity of gas at the contract base pressure and temperature, in cubic feet;
- $Q_d$=actual gas passed at existing metering conditions, cubic feet=
  cubic feet per turn calibration factor×number of turns;
- $P_m$=pressure multiplier=
  (weighted average existing gage pressure+barometric pressure)/(absolute pressure base);
- $T_m$=temperature multiplier=
  (temperature base+460)/(average flowing gas temperature+460); and
- $F_{vs}$=supercompressibility factor for the gas (taken as 1.0 here).

All temperatures here are shown in Fahrenheit degrees. Temperature and pressure multipliers are calibration factors entered into the microprocessor memory at the time of manufacture.

The microprocessor computes the quantity of gas passed during a defined interval, which may be 15, 30, or 60 minutes, using the updated values for temperature and pressure for that interval. The result is added to a previously computed quantity for a similar interval. The date and time at the moment of storing this result is also stored in a memory location. At a specified time during the month, the total reading is sent through the network to the supervising system. If a confirmation that the reading has been received by the supervising system, the total quantity obtained for the month is added to an always incrementing memory location, and the time and date of the last transaction stored. At this time the monthly gas memory locations are set to zero.

Figure 3:
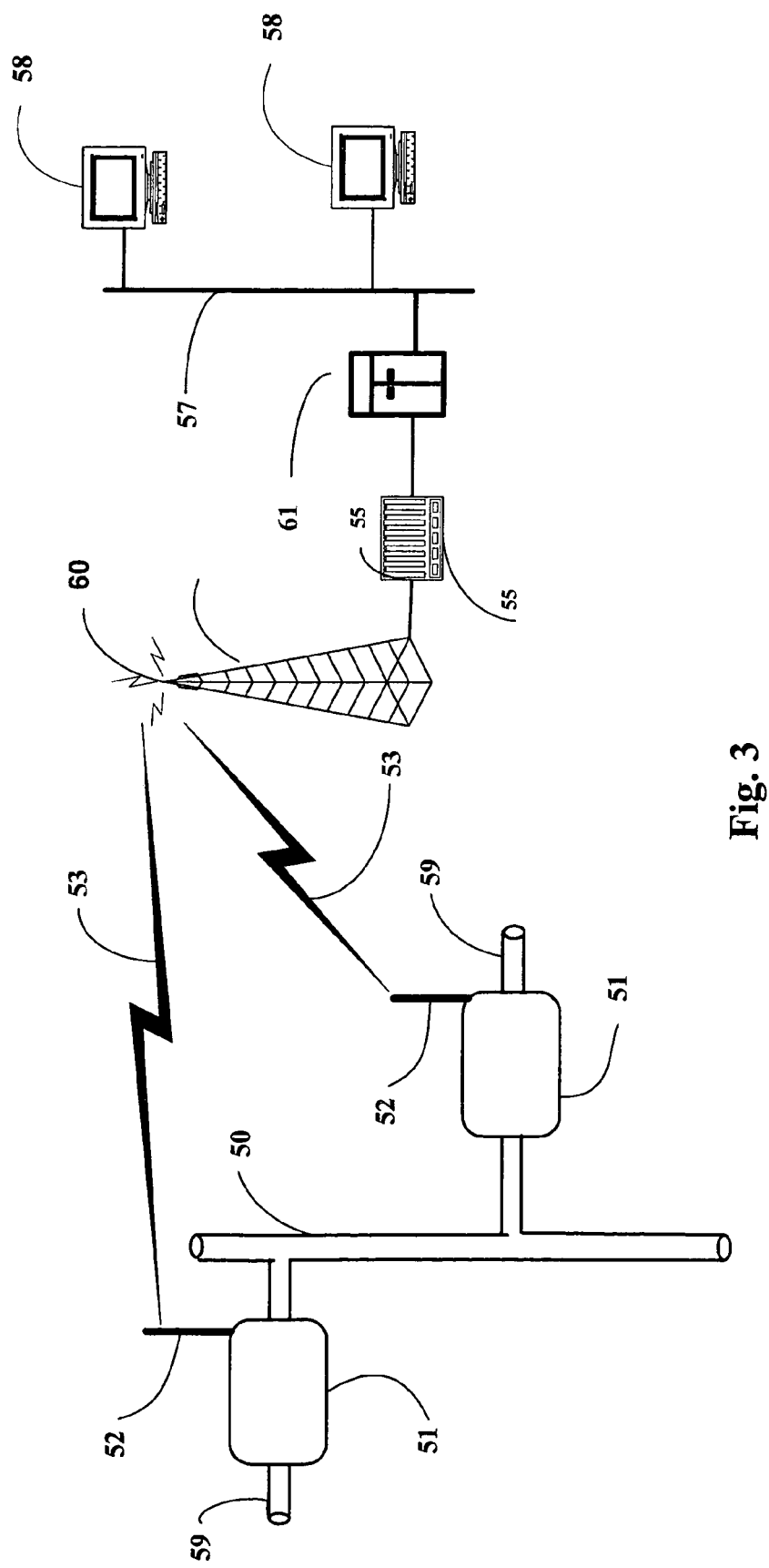
FIG. 3 shows a network that includes a central computer and a number of remote gas meters.

FIG. 3 shows gas measurement and control device 51 subject of present invention connected to gas mains 50 and supplying gas to premises through pipes 59. Measurement and control devices are linked via wireless connection 53 to via antenna 52 to a neighborhood base antenna 60. Base antenna equipment 55 converts wireless data communications to data acceptable to network computer server 61. Data is presented through network 57 to supervisory computer devices 58 for display, accounting, administrative, and emergency purposes.

Thus, there has been shown and described a remotely operated self-powered gas safety valve which fulfills all the objects and advantages sought therefor. The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. For example, the particular shapes and proportions of the elements of the invention may be varied as desired. Accordingly, all such changes, modifications, variations and other uses and applications which do not depart from the spirit and scope of the invention are deemed to be covered by this invention as defined in the following claims.

All of the patents recited herein, and in the Declaration attached hereto, if any, are hereby incorporated by reference as if set forth in their entirety herein. The details in such patents may be considered to be incorporable at Applicant's option, into the claims during prosecution as further limitations in the claims to patentably distinguish any amended claims from any applied prior art. The components disclosed in the various patents, patent applications, and publications, disclosed or incorporated by reference herein may be used in the embodiments of the present invention, as well as equivalents thereof.

All, or substantially all, of the components and methods of the various embodiments may be used with at least one embodiment or all of the embodiments, if more than one embodiment is described herein.

In the claims, means-plus-function clauses, if any, are intended to cover the structures described herein as performing the recited function and not only structural equivalents but also equivalent structures.

What is claimed is:

1. An apparatus for the control and measurement of the flow of gas, comprising:
   a) A rotary control valve;
   b) A planar base plate having a plurality of cavities to accept the different components of the apparatus;
   c) A direct current reversible non-sparking electronically commutated electric motor, said electric motor having gears to turn said rotary control valve;
   d) A position sensor to determine the position of said rotary control valve;
   e) A gas pressure sensor for measuring the gas flowing pressure and for the redundant check of the seating of said rotary control valve in fully closed position;
   f) An electric commutation switching and control circuit for said electric motor, wherein said control circuit turns electric motor on and off and reverses the rotary control valve's rotation direction;
   g) A remote supervisory device;

h) digital communications means for receiving external commands for opening and closing of said rotary control valve in response to an emergency or administrative action from the remote supervisory device;

i) An embedded microprocessor based gas metering apparatus for the measurement of gas flow at standard conditions;

j) An electric energy generating and storage system for the operation of the apparatus.

2. The apparatus for the control and measurement of the flow of gas according to claim 1, wherein said energy generating and storage system comprises:

a) electric power low-voltage generating means for intrinsically safe operation;

b) rechargeable energy storage means for storing energy;

c) energy storage management means for the controlled charging of said energy storage means over long periods of time;

d) energy management means to control the release of the stored energy in said energy storage means;

e) energy measurement means to ascertain the amount of energy available from said energy storage means.

3. The apparatus for the control and measurement of the flow of gas of claim 2, wherein said rechargeable energy storage means is a battery.

4. An apparatus for the control and measurement of the flow of gas according to claim 1, wherein said embedded microprocessor based gas metering apparatus comprises:

a) stored program means to measure the differential pressure across the fan rotor;

b) stored program means for correcting the flow of gas that bypasses the fan rotor with the measurement of the differential pressure across said fan rotor;

c) stored program means to periodically command the exercise of the rotary control valve to prevent sticking of said valve;

d) stored program means to process remote commands from the supervision system to close or open said control valve;

e) stored program means to check the position of the control valve in the fully open or fully closed position;

f) stored program means to report the position of the control valve to the supervisory device;

g) stored program means to measure the pressure at the outlet of the control valve for a redundant check of the valve position;

h) stored program means to measure the barometric pressure for calculation of standard contract gas flow conditions;

i) stored program means to report to supervisory device the measured gas flow;

j) stored program means to report to supervisory device the amount of charge stored in the energy generating and storage system.

5. An apparatus for the control and measurement of the flow of gas according to claim 1, wherein said planar base plate further comprises:

a) passageway means for the routing of the gas to the measuring and control elements;

b) gas tight enclosure means to separate the electronic components from the electromechanical components and the components in contact with the gas.

6. An apparatus for the control and measurement of the flow of gas according to claim 5, wherein said planar base plate cavities include:

a) a cavity with cover means to receive a rotary valve;

b) a cavity with cover means to receive a rotary fan; and c) insulated cavity means to receive and protect printed circuit board with electronic components.

7. The apparatus for the control and measurement of the flow of gas according to claim 6, wherein said planar base plate is serviceable from one side.

8. An apparatus for the control and measurement of the flow of gas according to claim 1, wherein said electric commutation switching and control module, comprises:

a) integrated electronic circuit element means for sparkless intrinsically safe commutation of said electric motor;

b) integrated electronic circuit element means for the control of the speed and direction of rotation of said electric motor.

9. An apparatus for the control and measurement of the flow of gas, comprising:

a) a vaned fan rotor, having a plurality of cavities that deliver a definite volume of gas with each turn, and having means to output a signal for each turn of the fan rotor;

b) a planar base plate;

c) an electric energy generating and storage system for the operation of the apparatus, coupled mechanically to said fan rotor, to generate electric energy to power the apparatus, said electric energy generating and storage system being lightly coupled to its electric load;

d) pressure sensing means for determination of operating pressure of flowing gas;

e) temperature sensing means for determination of temperature of flowing gas;

f) differential pressure sensing means to correct for gas that bypasses said fan rotor;

g) an embedded microprocessor based gas metering apparatus for the measurement of gas flow at standard conditions from the number of turns of said fan rotor, with numerical output indicative of volume flow;

h) analog to digital converting means to convert the analog output of sensors to a digital quantity for use by the embedded microprocessor;

i) barometric pressure sensor means for calculation of the standard contract conditions of gas delivery;

j) a remote supervisory device;

k) digital communications means for the communications of the values obtained to the remote supervisory device;

l) a rotary control valve means for turning on or off the flow of gas on command of the remote supervisory device;

m) a direct current reversible non-sparking electronically commutated electric motor, said electric motor having gears to turn said rotary control valve;

n) an electric commutation switching and control circuit for said electric motor, wherein said control circuit turns electric motor on and off and reverses the rotary control valve's rotation direction.

10. The apparatus for the control and measurement of the flow of gas according to claim 9, wherein said energy generating and storage system comprises:

a) electric power low-voltage generating means for intrinsically safe operation;

b) rechargeable energy storage means for storing energy;

c) energy storage management means for the controlled charging of said energy storage means over long periods of time;

d) energy management means to control the release of the stored energy in said energy storage means;

e) energy measurement means to ascertain the amount of energy available from said energy storage means.

11. The apparatus for the control and measurement of the flow of gas of claim 10, wherein said rechargeable energy storage means is a battery.

12. An apparatus for the control and measurement of the flow of gas according to claim 9, wherein said embedded microprocessor based gas metering apparatus comprises:
   a) stored program means to measure the differential pressure across the fan rotor;
   b) stored program means for correcting the flow of gas that bypasses the fan rotor with the measurement of the differential pressure across said fan rotor;
   c) stored program means to periodically command the exercise of the rotary control valve to prevent sticking of said valve;
   d) stored program means to process remote commands from the supervision system to close or open said control valve;
   e) stored program means to check the position of the control valve in the fully open or fully closed position;
   f) stored program means to report the position of the control valve to the supervisory device;
   g) stored program means to measure the pressure at the outlet of the control valve for a redundant check of the valve position;
   h) stored program means to measure the barometric pressure for calculation of standard contract gas flow conditions;
   i) stored program means to report to supervisory device the measured gas flow;
   j) stored program means to report to supervisory device the amount of charge stored in the energy generating and storage system.

13. An apparatus for the control and measurement of the flow of gas according to claim 9, wherein said planar base plate further comprises:
   a) passageway means for the routing of the gas to the measuring and control elements;
   b) gas tight enclosure means to separate the electronic components from the electromechanical components and the components in contact with the gas.

14. An apparatus for the control and measurement of the flow of gas according to claim 13, wherein said planar base plate cavities include:
   a) a cavity with cover means to receive a rotary valve;
   b) a cavity with cover means to receive a rotary fan; and
   c) insulated cavity means to receive and protect printed circuit board with electronic components.

15. The apparatus for the control and measurement of the flow of gas according to claim 14, wherein said planar base plate is serviceable from one side.

16. An apparatus for the control and measurement of the flow of gas according to claim 9, wherein said electric commutation switching and control module, comprises:
   a) integrated electronic circuit element means for sparkless intrinsically safe commutation of said electric motor;
   b) integrated electronic circuit element means for the control of the speed and direction of rotation of said electric motor.

17. An apparatus for the control and measurement of the flow of gas, comprising:
   a) A rotary control valve;
   b) A planar base plate having a cavity with cover means to receive a rotary valve, a cavity with cover means to receive a rotary fan, insulated cavity means to receive and protect printed circuit board with electronic components, passageway means for the routing of the gas to the measuring and control elements, and gas tight enclosure means to separate the electronic components from the electromechanical components and the components in contact with the gas;
   c) A direct current reversible non-sparking electronically commutated electric motor, said electric motor having gears to turn said rotary control valve;
   d) A position sensor to determine the position of said rotary control valve;
   e) A gas pressure sensor for measuring the gas flowing pressure and for the redundant check of the seating of said rotary control valve in fully closed position;
   f) An electric commutation switching and control circuit for said electric motor said switching and control circuit comprising integrated electronic circuit element means for sparkless intrinsically safe commutation of said electric motor, integrated electronic circuit element means for the control of the speed and direction of rotation of said electric motor, wherein said control circuit turns electric motor on and off and reverses the rotary control valve's rotation direction;
   g) A remote supervisory device;
   h) digital communications means for receiving external commands for opening and closing of said rotary control valve in response to an emergency or administrative action from the remote supervisory device;
   i) an embedded microprocessor based gas metering apparatus for the measurement of gas flow at standard conditions stored program means to measure the differential pressure across the fan rotor wherein said microprocessor based gas metering apparatus comprises stored program means for correcting the flow of gas that bypasses the fan rotor with the measurement of the differential pressure across said fan rotor, stored program means to periodically command the exercise of the rotary control valve to prevent sticking of said valve, stored program means to process remote commands from the supervision system to close or open said control valve, stored program means to check the position of the control valve in the fully open or fully closed position, stored program means to report the position of the control valve to the supervisory device; stored program means to measure the pressure at the outlet of the control valve for a redundant check of the valve position; stored program means to measure the barometric pressure for calculation of standard contract gas flow conditions, stored program means to report to supervisory device the measured gas flow, stored program means to report to supervisory device the amount of charge stored in the energy generating and storage system;
   j) an electric energy generating and storage system for the operation of the apparatus said energy generating and storage system comprising electric power low-voltage generating means for intrinsically safe operation, rechargeable energy storage means for storing energy, energy storage management means for the controlled charging of said energy storage means over long periods of time, energy management means to control the release of the stored energy in said energy storage means, and energy measurement means to ascertain the amount of energy available from said energy storage means;
   k) temperature sensing means for determination of temperature of flowing gas;
   l) differential pressure sensing means to correct for gas that bypasses said rotary control valve;

m) analog to digital converting means to convert the analog output of sensors to a digital quantity for use by the embedded microprocessor;

n) barometric pressure sensor means for calculation of the standard contract conditions of gas delivery.

18. The apparatus for the control and measurement of the flow of gas of claim 17, wherein said rechargeable energy storage means is selected from a group consisting of a battery and a super capacitor.

19. The apparatus for the control and measurement of the flow of gas of claim 17, wherein said planar base plate is serviceable from one side.

* * * * *